United States Patent [19]

Hamabata et al.

[11] 4,255,409

[45] Mar. 10, 1981

[54] PROCESS FOR PRODUCING ACICULAR GOETHITE

[75] Inventors: Toshihiro Hamabata; Shinji Umeki, both of Tokyo, Japan

[73] Assignee: TDK Electronics Company Limited, Tokyo, Japan

[21] Appl. No.: 102,441

[22] Filed: Dec. 11, 1979

[30] Foreign Application Priority Data

Dec. 11, 1978 [JP] Japan ............................... 53-153338

[51] Int. Cl.$^3$ ............................................. C01G 49/02
[52] U.S. Cl. ................................. 423/632; 252/62.56; 423/633; 423/634
[58] Field of Search ....................... 423/632, 633, 634; 252/62.56

[56] References Cited

U.S. PATENT DOCUMENTS

| | | | |
|---|---|---|---|
| 1,879,577 | 9/1932 | Stauf et al. | 423/632 X |
| 2,558,304 | 6/1951 | Marcot et al. | 423/633 X |
| 4,060,596 | 11/1977 | Nakamura | 423/633 |
| 4,136,158 | 1/1979 | Okuda et al. | 423/633 X |

*Primary Examiner*—Jack Cooper
*Attorney, Agent, or Firm*—Oblon, Fisher, Spivak, McClelland & Maier

[57] ABSTRACT

An alkali hydroxide is added to an aqueous solution of ferrous salt to form a precipitate and a part of the solution is separated to control a ratio of an anion to a ferrous component to less than 1 and the ferrous component is oxidized to acicular goethite with an alkali metal chlorate such as potassium chlorate.

7 Claims, No Drawings

PROCESS FOR PRODUCING ACICULAR GOETHITE

BACKGROUND OF THE INVENTION

1. FIELD OF THE INVENTION

The present invention relates to a process for producing an acicular goethite having fine particle size which can be used to produce magnetic particles having high coercive force.

2. DESCRIPTION OF THE PRIOR ARTS

Heretofore, it has been known to produce the acicular goethite by adding an alkali ion to an aqueous solution of ferrous salt such as ferrous sulfate to give pH of higher than 11, and oxidizing it with air.

Thus, the conventional process has the disadvantages that it takes a long time for the production and the resulting acicular goethite has large particle size.

Recently, in the magnetic recording medium industry, it has been required to obtain a magnetic powder having high characteristics which can be used in high density. In order to satisfy such requirements, a magnetic powder having smaller particle size and higher coercive force has been required. However, it has been difficult to obtain such magnetic powder having small particle size and high coercive force by the conventional process.

The inventors have studied to overcome the problem and have found that the reaction time can be remarkably shortened by oxidizing a ferrous component with air etc. at a ratio of an anion such as sulfuric ion to ferrous ion such as ferrous sulfate of less than 1 to obtain an acicular goethite having fine particle size and the resultant $\gamma$-$Fe_2O_3$ has high coercive force.

SUMMARY OF THE INVENTION

It is an object of the present invention to provide a process for producing an improved acicular goethite having fine particle size which can be used to produce magnetic particles having high coercive force.

The foregoing and other object of the present invention have been attained by providing a process for producing an acicular goethite which comprises adjusting pH of an aqueous solution of a ferrous salt to be higher than 11 and adjusting a ratio of an anion to the ferrous component to lower than 1 and oxidizing it with an alkali metal chlorate such as potassium chlorate as an oxidant.

DETAILED DESCRIPTION OF THE PREFERRED EMBODIMENTS

In the process of the present invention, the ferrous salt such as ferrous sulfate is used.

Various ferrous salts such as ferrous sulfate, ferrous chloride, ferrous nitrate, ferrous acetate, ferrous phosphate etc. can be used, though ferrous sulfate is preferable.

A concentration of the ferrous salt is usually in a range of 1 to 80 wt.%, preferably 3 to 50 wt.% especially 5 to 20 wt.%.

The ferrous salt is usually dissolved in water and if necessary, a desired modifier is added. An alkali metal hydroxide or carbonate is added to an aqueous solution of ferrous sulfate, nitrate, chloride, phosphate or acetate to precipitate ferrous hydroxide and the supernatant or filtrate is separated to control the ratio of the anion of the ferrous salt to the ferrous hydroxide to less than 1.

In accordance with the process of the present invention, an alkali metal compound especially an alkali hydroxide such as sodium hydroxide and potassium is added to give pH of higher than 11. The ratio of an anion to the ferrous component is reduced to lower than 1 and the oxidation of the ferrous component is carried out with oxygen such as air at lower than 80° C. whereby an acicular goethite having fine particle size can be obtained.

It is preferable to give pH of higher than 13. In order to form $\alpha$FeOOH in an alkaline side, it is necessary to give pH of higher than 11. When pH is in a range of 7 to 9, $Fe_3O_4$ is contaminated. It is preferable to give higher pH to obtain acicular $\alpha$FeOOH.

The oxidation can be carried out with an alkali metal chlorate such as potassium chlorate, sodium chlorate etc. as an oxidant. The temperature in the oxidation is usually in a range of 30° to 55° C. When it is heated at higher than 60° C., $Fe_3O_4$ is contaminated.

The ratio of the anion to the ferrous component is lower than 1 and usually 0.1 to 0.5, preferably 0.15 to 0.3 especially about 0.17. When the ratio of the anion to the ferrous component is about 0.17, the acicular form is optimum and high coercive force can be obtained. The ratio can be controlled by separating a supernatant after adding an alkali to the solution of ferrous salt.

The oxidation with potassium chlorate can be carried out together with the additional oxidation by bubbling the oxygen containing gas through the alkaline ferrous salt aqueous solution having pH of higher than 11 or with the other oxidant. The reaction time can be remarkably shortened so that fine acicular goethite can be obtained.

The acicular goethite obtained by the present invention has fine particle size and $\gamma$-$Fe_2O_3$ obtained from the acicular goethite has also fine particle size and it has superior magnetic characteristics especially high coercive force to those of the conventional one.

The present invention will be further illustrated by certain examples and references which are provided for purposes of illustration only and are not intended to be limiting the present invention.

REFERENCE

In 1.0 liter of water, 100 g. of a crystal of $FeSO_4.7H_2O$ was dissolved and then 200 g. of NaOH was added and water was added to give 1.5 liter of the solution.

The solution was kept for 1 day to result a precipitation. The supernatant of the solution was decanted and water was added to give 1.5 liter. The solution had pH of 13.6.

The solution was kept at 50° C. and air was bubbled to oxidize it. The reaction was completed for about 5 hours.

The precipitate resulted by the reaction had an acicular goethite. According to the observation of the product by an electron microscope, the product had particle sizes of about 0.6 to 0.9 $\mu$m. The product of the acicular goethite was treated by the conventional treatments of the heat-dehydration at 600° C.-the reduction at 400° C.-the oxidation at 350° C. in an electric furnace. The magnetic characteristics of the resulting $\gamma$-$Fe_2O_3$ had Hc of 400(Oe) and $\sigma$s of 70(emu/g.) and a specific surface area of about 40 $m^2$/g. measured by BET method.

EXAMPLE 1

Into 1.0 liter of water, 100 g. of a crystal of $FeSO_4.7H_2O$ was dissolved and then 200 g. of NaOH was added and water was added to give 1.5 liter of the solution.

1250 Milliliter of the supernatant of the solution was decanted and 9.2 g. of potassium chlorate was added and water was added to give 1.5 liter of the solution. The ratio of the anion to the ferrous component was 0.17. The solution had pH of 13.6.

The solution was kept at 50° C. to oxidize it. The reaction was completed for about 6 hours.

The precipitate resulted by the reaction had an acicular goethite. According to the observation of the product by an electron microscope, the product had particle sizes of about 0.6 to 0.9 μm. The product of the acicular geothite was treated by the conventional treatments of the heat-dehydration at 600° C.-the reduction at 400° C.-the oxidation at 350° C. in an electric furnace. The magnetic characteristics of the resulting $\gamma$-$Fe_2O_3$ had Hc of 460 (Oe) and $\sigma s$ of 72 (emu/g.) and a specific surface area of about 45 m$^2$/g. measured by BET method.

EXAMPLE 2

Into 1.0 liter of water, 100 g. of a crystal of $FeSO_4.7H_2O$ was dissolved and then 200 g. of NaOH was added and water was added to give 1.5 liter of the solution.

1250 Milliliter of the supernatant of the solution was decanted and 9.2 g. of potassium chlorate was added and water was added to give 1.5 liter of the solution. The ratio of the anion to the ferrous component was 0.17. The solution has pH of 13.6.

The solution was kept at 40° C. to oxidize it. The reaction was completed for about 8 hours.

The precipitate resulted by the reaction had an acicular goethite. According to the observation of the product by an electron microscope, the product had particle sizes of about 0.4 to 0.7 μm. The product of the acicular goethite was treated by the conventional treatments of the heat-dehydration at 600° C.-the reduction at 400° C.-the oxidation at 350° C. in an electric furnace. The magnetic characteristics of the resulting $\gamma$-$Fe_2O_3$ had Hc of 450 (Oe) and $\sigma s$ of 72 (emu/g.) and a specific surface area of about 50 m$^2$/g. measured by BET method.

EXAMPLE 3

Into 1.0 liter of water, 100 g. of a crystal of $FeSO_4.7H_2O$ was dissolved and then 200 g. of NaOH was added and water was added to give 1.5 liter of the solution.

1250 Milliliter of the supernatant of the solution was decanted and 9.2 g. of potassium chlorate was added and water was added to give 1.5 liter of the solution. The ratio of the anion to the ferrous component was 0.17. The solution had pH of 13.6.

The solution was kept at 30° C. to oxidize it. The reaction was completed for about 10 hours.

The precipitate resulted by the reaction had an acicular goethite. According to the observation of the product by an electron microscope, the product had particle sizes of about 0.2 to 0.5 μm. The product of the acicular goethite was treated by the conventional treatments of the heat-dehydration at 600° C.-the reduction at 400° C.-the oxidation at 350° C. in an electric furnace. The magnetic characteristics of the resulting $\gamma$-$Fe_2O_3$ had Hc of 440 (Oe) and $\sigma s$ of 71 (emu/g.) and a specific surface area of about 55 m$^2$/g. measured by BET method.

EXAMPLE 4

Into 1.0 liter of water, 100 g. of a crystal of $FeSO_4.7H_2O$ was dissolved and then 200 g. of NaOH was added and water was added to give 1.5 liter of the solution.

750 Milliliter of the supernatant of the solution was decanted and 9.2 g. of potassium chlorate was added and water was added to give 1.5 liter of the solution. The ratio of the anion to the ferrous component was 0.50. The solution had pH of 13.6.

The solution was kept at 50° C. to oxidize it. The reaction was completed for about 6 hours.

The precipitate resulted by the reaction had an acicular goethite. According to the observation of the product by an electron microscope, the product had particle sizes of about 0.6 to 0.9 μm. The product of the acicular goethite was treated by the conventional treatments of the heat-dehydration at 600° C.-the reduction at 400° C.-the oxidation at 350° C. in an electric furnace. The magnetic characteristics of the resulting $\gamma$-$Fe_2O_3$ had Hc of 450 (Oe) and $\sigma s$ of 70 (emu/g.) and a specific surface area of about 42 m$^2$/g. measured by BET method.

EXAMPLE 5

Into 1.0 liter of water, 100 g. of a crystal of $FeSO_4.7H_2O$ was dissolved and then 200 g. of NaOH was added and water was added to give 1.5 liter of the solution.

750 Milliliter of the supernatant of the solution was decanted and 9.2 g. of potassium chlorate was added and water was added to give 1.5 liter of the solution. The ratio of the anion to the ferrous component was 0.50. The solution had pH of 13.6.

The solution was kept at 40° C. to oxidize it. The reaction was completed for about 8 hours.

The precipitate resulted by the reaction had an acicular goethite. According to the observation of the product by an electron microscope, the product had particle sizes of about 0.4 to 0.7 μm. The product of the acicular goethite was treated by the conventional treatments of the heat-dehydration at 600° C.-the reduction at 400° C.-the oxidation at 350° C. in an electric furnace. The magnetic characteristics of the resulting $\gamma$-$Fe_2O_3$ had Hc of 430 (Oe) and $\sigma s$ of 70 (emu/g.) and a specific surface area of about 42 m$^2$/g. measured by BET method.

EXAMPLE 6

Into 1.0 liter of water, 100 g. of a crystal of $FeSO_4.7H_2O$ was dissolved and then 200 g. of NaOH was added and water was added to give 1.5 liter of the solution.

750 Milliliter of the supernatant of the solution was decanted and 9.2 g. of potassium chlorate was added and water was added to give 1.5 liter of the solution. The ratio of the anion to the ferrous component was 0.50. The solution had pH of 13.6.

The solution was kept at 30° C. to oxidize it. The reaction was completed for about 10 hours.

The precipitate resulted by the reaction had an acicular goethite. According to the observation of the product by an electron microscope, the product had particle sizes of about 0.2 to 0.5 μm. The product of the acicular goethite was treated by the conventional treatments of the heat-dehydration at 600° C.-the reduction at 400° C.-the oxidation at 350° C. in an electric furnace. The magnetic characteristics of the resulting $\gamma$-$Fe_2O_3$ had Hc of 420 (Oe) and σ5 of 70 (emu/g.) and a specific surface area of about 52 m²/g. measured by BET method.

EXAMPLE 7

Into 1.0 liter of water, 100 g. of a crystal of $FeSO_4.7H_2O$ was dissolved and then 200 g. of NaOH was added and water was added to give 1.5 liter of the solution.

1250 Milliliter of the supernatant of the solution was decanted and 18.4 g. of potassium chlorate was added and water was added to give 1.5 liter of the solution. The ratio of the anion to the ferrous component was 0.17. The solution had pH of 13.6.

The solution was kept at 50° C. to oxidize it. The reaction was completed for about 6 hours.

The precipitate resulted by the reaction had an acicular goethite. According to the observation of the product by an electron microscope, the product had particle sizes of about 0.6 to 0.9 μm. The product of the acicular goethite was treated by the conventional treatments of the heat-dehydration at 600° C.-the reduction at 400° C.-the oxidation at 350° C. in an electric furnace. The magnetic characteristics of the resulting $\gamma$-$Fe_2O_3$ had Hc of 470 (Oe) and σs of 70 (emu/g.) and a specific surface area of about 50 m²/g. measured by BET method.

EXAMPLE 8

Into 1.0 liter of water, 100 g. of a crystal of $FeSO_4.7H_2O$ was dissolved and then 200 g. of NaOH was added and water was added to give 1.5 liter of the solution.

1250 Milliliter of the supernatant of the solution was decanted and 18.4 g. of potassium chlorate was added and water was added to give 1.5 liter of the solution. The ratio of the anion to the ferrous component was 0.17. The solution had pH of 13.6.

The solution was kept at 40° C. to oxidize it. The reaction was completed for about 8 hours.

The precipitate resulted by the reaction had an acicular goethite. According to the observation of the product by an electron microscope, the product had particle sizes of about 0.4 to 0.7 μm. The product of the acicular goethite was treated by the conventional treatments of the heat-dehydration at 600° C.-the reduction at 400° C.-the oxidation at 350° C. in an electric furnace. The magnetic characteristics of the resulting $\gamma$-$Fe_2O_3$ had Hc of 455 (Oe) and σs of 71 (emu/g.) and a specific surface area of about 53 m²/g. measured by BET method.

EXAMPLE 9

Into 1.0 liter of water, 100 g. of a crystal of $FeSO_4.7H_2O$ was dissolved and then 200 g. of NaOH was added and water was added to give 1.5 liter of the solution.

1250 Milliliter of the supernatant of the solution was decanted and 18.4 g. of potassium chlorate was added and water was added to give 1.5 liter of the solution. The ratio of the anion to the ferrous component was 0.17. The solution had pH of 13.6.

The solution was kept at 30° C. to oxidize it. The reaction was completed for about 10 hours.

The precipitate resulted by the reaction had an acicular goethite. According to the observation of the product by an electron microscope, the product had particle sizes of about 0.2 to 0.5 μm. The product of the acicular goethite was treated by the conventional treatments of the heat-dehydration at 600° C.-the reduction at 400° C.-the oxidation at 350° C. in an electric furnace. The magnetic characteristics of the resulting $\gamma$-$Fe_2O_3$ had Hc of 440(Oe) and σs of 70 (emu/g.) and a specific surface area of about 60 m²/g. measured by BET method.

EXAMPLE 10

Into 1.0 liter of water, 100 g. of a crystal of $FeSO_4.7H_2O$ was dissolved and then 200 g. of NaOH was added and water was added to give 1.5 liter of the solution.

750 Milliliter of the supernatant of the solution was decanted and 18.4 g. of potassium chlorate was added and water was added to give 1.5 liter of the solution. The ratio of the anion to the ferrous component was 0.50. The solution had pH of 13.6.

The solution was kept at 50° C. to oxidize it. The reaction was completed for about 6 hours.

The precipitate resulted by the reaction had an acicular goethite. According to the observation of the product by an electron microscope, the product had particle sizes of about 0.6 to 0.9 μm. The product of the acicular goethite was treated by the conventional treatments of the heat-dehydration at 600° C.-the reduction at 400° C.-the oxidation at 350° C. in an electric furnace. The magnetic characteristics of the resulting $\gamma$-$Fe_2O_3$ had Hc of 450(Oe) and σs of 71 (emu/g.) and a specific surface area of about 44 m²/g. measured by BET method.

EXAMPLE 11

Into 1.0 liter of water, 100 g. of a crystal of $FeSO_4.7H_2O$ was dissolved and then 200 g. of NaOH was added and water was added to give 1.5 liter of the solution.

750 Milliliter of the supernatant of the solution was decanted and 18.4 g. of potassium chlorate was added and water was added to give 1.5 liter of the solution. The ratio of the anion to the ferrous component was 0.50. The solution had pH of 13.6.

The solution was kept at 40° C. to oxidize it. The reaction was completed for about 8 hours.

The precipitate resulted by the reaction had an acicular goethite. According to the observation of the product by an electron microscope, the product had particle sizes of about 0.4 to 0.7 μm. The product of the acicular goethite was treated by the conventional treatments of the heat-dehydration at 600° C.-the reduction at 400° C.-the oxidation at 350° C. in an electric furnace. The magnetic characteristics of the resulting $\gamma$-$Fe_2O_3$ had Hc of 450 (Oe) and σs of 71 (emu/g.) and a specific surface area of about 48 m²/g. measured by BET method.

EXAMPLE 12

Into 1.0 liter of water, 100 g. of a crystal of $FeSO_4.7H_2O$ was dissolved and then 200 g. of NaOH was added and water was added to give 1.5 liter of the solution.

750 Milliliter of the supernatant of the solution was decanted and 18.4 g. of potassium chlorate was added and water was added to give 1.5 liter of the solution. The ratio of the anion to the ferrous component was 0.50. The solution had pH of 13.6.

The solution was kept at 30° C. to oxidize it. The reaction was completed for about 10 hours.

The precipitate resulted by the reaction had an acicular goethite. According to the observation of the product by an electron microscope, the product had particle sizes of about 0.2 to 0.5 μm. The product of the acicular geothite was treated by the conventional treatments of the heat-dehydration at 600° C.-the reduction at 400°

C.-the oxidation at 350° C. in an electric furnace. The magnetic characteristics of the resulting $\gamma$-$Fe_2O_3$ had Hc of 430 (Oe) and $\sigma s$ of 70 (emu/g.) and a specific surface area of about 52 $m^2$/g. measured by BET method.

The advantages of the use of the specific oxidizing agent are to attain easily the control of oxidization and the uniform reaction in comparison with that of the oxidation with air.

We claim:

1. A process for producing an acicular goethite comprising:

adjusting the pH of an aqueous solution of a ferrous salt to a value higher than 11;

allowing a precipitate of ferrous hydroxide to form;

adjusting the ratio of the anion of the ferrous salt to the ferrous hydroxide to 0.1 to 0.5 by separating a portion of the supernatant from said precipitate; and oxidizing the precipitate with an alkali metal chlorate at a temperature lower than 80° C.

2. The process according to claim 1, wherein the pH of the aqueous solution of a ferrous salt is adjusted to a value higher than 11 by adding an alkali metal hydroxide or carbonate thereto.

3. The process according to claim 1, wherein the ferrous salt is selected from the group consisting of ferrous sulfate, ferrous nitrate, ferrous chloride, ferrous phosphate and ferrous acetate.

4. The process according to claim 1, wherein the ratio of the anion of the ferrous salt to the ferrous hydroxide is 0.15 to 0.3.

5. The process according to claim 4, wherein the ratio of the anion of the ferrous salt to the ferrous hydroxide is about 0.17.

6. The process according to claim 1, wherein the temperature of the oxidation is in the range of 30° to 55° C.

7. The process according to claim 1, wherein the oxidation is carried out with an alkali metal chlorate and with the bubbling of an oxygen-containing gas through the remaining supernatant and precipitate.

* * * * *